United States Patent
Le Roy

(10) Patent No.: US 9,910,681 B2
(45) Date of Patent: *Mar. 6, 2018

(54) INSTANCE INTERFACES AND MIX-INS FOR DYNAMIC LANGUAGES

(71) Applicant: Microsoft Technology Licensing, LLC, Redmond, WA (US)

(72) Inventor: Bertrand Le Roy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,064

(22) Filed: May 3, 2016

(65) Prior Publication Data

US 2016/0357575 A1     Dec. 8, 2016

Related U.S. Application Data

(63) Continuation of application No. 11/888,577, filed on Aug. 1, 2007, now Pat. No. 9,361,129.

(51) Int. Cl.
*G06F 9/44* (2006.01)
*G06F 11/07* (2006.01)

(52) U.S. Cl.
CPC ........ *G06F 9/4433* (2013.01); *G06F 11/0718* (2013.01); *G06F 8/24* (2013.01); *G06F 8/315* (2013.01)

(58) Field of Classification Search
CPC ..... G06F 8/00; G06F 8/24; G06F 8/30; G06F 8/31; G06F 8/312; G06F 8/315; G06F 8/40; G06F 8/436–8/437; G06F 8/52; G06F 9/3058; G06F 9/30072; G06F 9/4421; G06F 9/4425; G06F 9/4428–9/4431; G06F 9/4433; G06F 9/44589; G06F 11/0703; G06F 11/0718; G06F 11/3612; G06F 11/3664; G06F 11/3696

See application file for complete search history.

(56) References Cited

U.S. PATENT DOCUMENTS 5,515,536 A    5/1996   Corbett et al.
5,560,014 A    9/1996   Imamura
(Continued)

OTHER PUBLICATIONS

Anonymous, "GC: AspectsContainer-org.nanocontainer.aop. AspectsContainer", GrepCode [online], No Date [retrieved Feb. 5, 2017], Retrieved from Internet: <URL: http://grepcode.com/file/repo1.maven.org/maven2/org.nanocontainer/nanocontainer-aop/1. 1-RC-1/org/nanocontainer/aop/AspectsContainerjava?av=f>, p. 1.*

(Continued)

*Primary Examiner* — Todd Aguilera

(57) ABSTRACT

Various technologies and techniques are disclosed for using contracts in dynamic languages. For example, a contract can be directly associated with an object. The contract can then be used to provide type safety for the object. As another example, contracts can be used with mix-ins. A declaration for a contract is provided with a mix-in. The contract is associated with a target object at runtime when applying the mix-in. Conditions can be assigned to mix-ins that must be met before the mix-in can be applied to the target object. At runtime, if the target object meets the one or more conditions, then the mix-in can be applied to the target object.

17 Claims, 10 Drawing Sheets

(56) References Cited

U.S. PATENT DOCUMENTS

| | | | |
|---|---|---|---|
| 5,778,227 | A | 7/1998 | Jordan |
| 5,872,973 | A | 2/1999 | Mitchell et al. |
| 6,044,216 | A | 3/2000 | Bhargava et al. |
| 6,088,739 | A | 7/2000 | Pugh et al. |
| 6,212,436 | B1 | 4/2001 | Marple et al. |
| 6,212,578 | B1 | 4/2001 | Racicot et al. |
| 6,397,384 | B1 | 5/2002 | Briggs |
| 6,405,360 | B1 | 6/2002 | Bohrer et al. |
| 6,704,743 | B1 | 3/2004 | Martin |
| 6,748,570 | B1 | 6/2004 | Bahrs et al. |
| 6,944,845 | B2 | 9/2005 | Graser et al. |
| 7,080,383 | B1 | 7/2006 | Fernando et al. |
| 7,143,416 | B1 | 11/2006 | Nachef et al. |
| 7,281,242 | B2 | 10/2007 | Inamdar |
| 2002/0015758 | A1 | 2/2002 | Kreiberg et al. |
| 2002/0156758 | A1 | 10/2002 | Cote et al. |
| 2003/0120824 | A1 | 6/2003 | Shattuck et al. |
| 2003/0149960 | A1 | 8/2003 | Inamdar |
| 2004/0006765 | A1 | 1/2004 | Goldman |
| 2004/0243977 | A1 | 12/2004 | Shou et al. |
| 2005/0229186 | A1 | 10/2005 | Mitchell et al. |
| 2006/0101032 | A1 | 5/2006 | Sutter et al. |
| 2006/0130038 | A1 | 6/2006 | Claussen et al. |
| 2006/0206905 | A1 | 9/2006 | Werner |
| 2007/0168949 | A1 | 7/2007 | Shattuck et al. |

OTHER PUBLICATIONS

"GC:Nanocontainer-Aop-GrepCode Java Project Source", Retrieved From <<http://grepcode.com/project/repo1.maven.org/maven2/org.nanocontainer/nanocontainer-aop/>>, Retrieved on: Sep. 25, 2015, 1 Page.

"Mixin" Retrieved From <<http://web.archive.org/web/20060319044106/http://en.wikipedia.org/wiki/Mixins>, Mar. 19, 2006, 2 Pages.

"Final Office Action Issued in U.S. Appl. No. 11/888,577", dated Jul. 17, 2014, 23 Pages.

"Final Office Action Issued in U.S. Appl. No. 11/888,577", dated Dec. 4, 2013, 23 Pages.

"Final Office Action Issued in U.S. Appl. No. 11/888,577", dated Oct. 24, 2011, 23 Pages.

"Non-Final Office Action Issued in U.S. Appl. No. 11/888,577", dated Jun. 26, 2013, 20 Pages.

"Non-Final Office Action Issued in U.S. Appl. No. 11/888,577", dated Apr. 27, 2011, 16 Pages.

"Non-Final Office Action Issued in U.S. Appl. No. 11/888,577", dated Mar. 25, 2014, 22 Pages.

"Non-Final Office Action Issued in U.S. Appl. No. 11/888,577", dated Feb. 17, 2015, 25 Pages.

"Non-Final Office Action Issued in U.S. Appl. No. 11/888,577", dated Nov. 12, 2015, 29 Pages.

"Notice of Allowance Issued in U.S. Appl. No. 11/888,577", dated Mar. 8, 2016, 11 Pages.

Ancona, et al., "Jam—A Smooth Extension of Java with Mixins", In European Conference on Object-Oriented Programming, Jun. 12, 2000, pp. 154-178.

Bak, et al., "Mixins in Strongtalk", In ECOOP Workshop on Inheritance, Jun. 6, 2002, 20 Pages.

Bettini, et al., "Coordinating Mobile Object-Oriented Code", In Lecture Notes in Computer Science of Coordination Models and Languages, vol. 2315 of the Series, Mar. 14, 2002, pp. 56-71.

Breuel, Thomas M., "Implementing Dynamic Language Features in Java using Dynamic Code Generation", In Proceedings of 39th International Conference and Exhibition on Technology of Object-Oriented Languages and Systems, Jul. 29, 2001, pp. 143-152.

Dvoinikov, Dmitry, "Method Signature Checking Decorators", Retrieved From <<http://web.archive.org/web/20060622203617/http://aspn.activestate.com/ASPN/Cookbook/Python/Recipe/426123>>, Feb. 20, 2006, 5 Pages.

Ernst, Erik, "Safe Dynamic Multiple Inheritance", In Nordic Journal of Computing, Mar. 1, 2002, 19 Pages.

Flatt, et al., "Scheme with Classes, Mixins, and Traits", In Proceedings of the 4th Asian Conference on Programming Languages and Systems, Nov. 8, 2006, 20 Pages.

Kamina, et al., "McJava—A Design and Implementation of Java with Mixin-Types", In Lecture Notes in Computer Science of Programming Languages and Systems, vol. 3302 of the series, Nov. 4, 2004, pp. 398-414.

Martin, Pierre, "A Reflective Approach to Building Extensible Distributed Actor-based Languages", In Dissertation submitted in partial fulfillment of the requirements for the degree of Licentiaat in de Toegepaste Informatica, May, 2006, 114 Pages.

Le Roy, Bertrand., "Mixins for Atlas", Retrieved From <<http://weblogs.asp.net/bleroy/archive/2006/08/04/Mixins-or-Atlas.aspx>>, Aug. 4, 2006, 4 Pages.

Strembeck, et al., "Definition of an Aspect-Oriented DSL using a Dynamic Language", In Proceedings of the Workshop on Open and Dynamic Aspect Languages, Mar. 2006, 4 Pages.

Zdun, et al., "Object-Based and Class-Based Composition of Transitive Mixins", In Journal of Information and Software Technology, vol. 49, Issue 8, pp. 871-891.

\* cited by examiner

INSTANCE INTERFACES AND MIX-INS FOR DYNAMIC LANGUAGES

CROSS-REFERENCE TO RELATED APPLICATIONS

This application claims priority to and is a continuation of co-pending U.S. patent application Ser. No. 11/888,577 entitled "Instance Interfaces and Mix-ins for Dynamic Languages" and filed Aug. 1, 2007, which is incorporated herein by reference.

BACKGROUND

Software developers create software using one or more programming languages. Programming languages are usually either statically typed languages, or they are dynamic languages. Statically typed languages are generally languages that provide a fixed code structure and/or static typing. With a fixed code structure, classes and other structures are immutable at runtime, meaning that their structure cannot be modified after the class or structure is created. With static typing, variables and parameters must be assigned at design time so that they can be known at compile time. Statically typed languages can include some or all of these characteristics. Some examples of statically typed languages include C#, Java, C, and C++.

Dynamic languages are generally languages that provide dynamic variable typing and/or runtime code modification. With dynamic variable typing, variables do not have to be declared before use, and their type (integer, string, etc.) is thus not determined until runtime. Languages that implement dynamic typing are often referred to as dynamically typed languages (in addition to the term dynamic languages). With runtime code modification, classes and other details about the structure of the source code can be modified dynamically. For example, methods may be added to classes or structures at runtime. Some examples of dynamic languages include JavaScript, Ruby, Python, and PHP. These languages are often referred to as "scripting" languages because of the fact that their source code is contained in one or more textual script files. The term "dynamic language script" as used herein is meant to include one or more files that contain source code written in a dynamic language.

These features typically provided by dynamic languages offer software developers with a lot of flexibility. As an example, dynamic languages can be used to build objects from scratch or extend existing objects at runtime. The term "object" as used herein is referring to objects in the object oriented world of programming, and is meant to include an individual unit of runtime data storage that is used as the basic building block of a program. Objects can optionally have methods (functions, procedures, etc.) associated with them that can be run within the context of the unit of runtime data storage. While dynamic languages offer flexibility, with this flexibility comes some problems. For example, a well defined type is a lot more difficult to determine since the specific type that a variable will be used for does not have to be declared in advance. Thus, the program does not know whether a variable called counter is an integer, a string, a double, or something else. This can make parameter validation and other validations problematic, because any verification has to make assumptions about what a parameter object can or cannot do.

The feature known as "type safety", usually associated with statically typed languages, seems to conflict with the spirit of dynamic languages. The term type safety generally refers to determining what type an object or variable represents, and ensuring that the object or variable is only used in a manner consistent with the type expected. For example, if a line of code attempts to assign a variable that stores an integer value to a variable that stores a string value, the compiler could raise a compiler error based upon a type mismatch. That is because the integer variable is not capable of storing the value represented in the string variable.

As noted earlier, in dynamically typed languages, such type safety is not present. This problem is usually solved using a technique known as "duck-typing", which uses the reflection capabilities that dynamic languages typically possess to inspect the object and check for a particular member's existence before using it. This is often called "duck-typing" based on the saying "if it quacks like a duck, you can consider it to be a duck". While the duck-typing technique can work well in common scenarios, it presents a number of challenges.

One problem with duck typing is that there is not a one to one mapping between a member (variable, object, etc.) name and the semantics of that member. The context is usually necessary to get this one to one mapping. This context, in statically typed languages, is the type. For example, if an object has a start method, it could have been written to start an animation, which would be clear if it is known that the object is an animation. Alternatively, the object could have been written to start a timer, which is clear if it is known that the object is a timer. This works well if the context can be easily inferred, such as if the code that creates the object is the same code that uses it. But this scenario fails when the context is not available. For example, suppose the program is inspecting an unknown object graph and wants to start all animations in it. By relying on the presence of a start method only, then all timers would be started, which is not the intent. Using the hypothetical example with statically typed languages, you can just check for the type of an object, and if it derives from Animation, you can call the start method on the Animation object with reasonable confidence that what you intend is what will happen.

Another problem with duck-typing is that it hides important details within the code. For example, in dynamic languages, you typically have to look at the implementation (the underlying source code of the particular object or method) to figure out what constraints are going to be imposed on parameters. This problem is usually solved by putting the burden on documentation. However, this part of documentation is usually automatically generated from method signatures in statically typed languages. This is because in statically typed languages, the signature of a method generally identifies everything needed in order to call it. Thus, dynamic languages are losing at least part of the boost of productivity provided by dynamic typing by requiring manual authoring of documentation that could be generated.

In statically typed languages, these problems do not typically exist because objects are instances of one or several types and implement one or more contracts, usually in the way of interfaces. The term "contract" means a specified agreement that any object or other programming structure that is providing an implementation for a given functionality agrees to implement. Interfaces are the most common way for providing a definition for a contract. Interfaces require that any object (or other member) that wishes to implement the interface provide a specific implementation for all of the members that are defined in the interface. Some non-limiting examples of members include properties, methods, events, and/or fields. The interface itself does not contain any implementation of the functionality, but rather just the definition of what the implementation should contain. There are also other ways to specify a contract, such as by specifying an abstract base class that other classes can inherit from, or by using other techniques for specifying what features certain objects or other members must implement.

Contracts and interfaces are very useful, but as a practical matter, they usually do not exist at all in dynamic languages. Interfaces (or other contracts) make a lot less sense when objects can be built from scratch, such as with dynamic languages. The root of that problem is that interfaces are implemented by types. As previously discussed, statically typed languages typically provide type safe members with types that are known at compile time, whereas dynamic languages do not. Thus, with statically typed languages, the interface is associated with a type, and the type is then associated with the underlying object. Thus, the relationship between the interface and the object it is associated with is an indirect relationship that is established through the type itself. The lack of type safety is one reason why interfaces are not typically used in dynamic languages as they are in statically typed languages.

On a separate but related note, some dynamic languages use a generic way of adding a specific set of features to an object dynamically, but under the form of a module or mix-in. More specifically, a mix-in is one or more member implementations that can be added dynamically to an object (the target). The term "target object" will be used herein to refer to an object to which a mix-in is to be applied. Mix-ins are a concept similar to multiple inheritance, but for dynamic languages. A mix-in can contain methods that can be added in one operation to an object, such as with an equivalent to an include statement that refers to the mix-in group of code. From the user code's perspective, it is still necessary in principle to test for the existence of each method before using it. There is also a small possibility that an object may appear to provide certain functionality but be something entirely different. Furthermore, members defined in the mix-in may conflict with and overwrite existing members of the object.

SUMMARY

Various technologies and techniques are disclosed for using contracts in dynamic languages. In one implementation, a contract or interface can be directly associated with an object. The contract or interface can then be used to provide type safety for the object. As a non-limiting example, the contract can be used to ensure that one or more parameters passed to a particular method in the object are of the data types expected by the method.

In another implementation, contracts can be used with mix-ins. A declaration for an implemented contract is provided with a mix-in. The implemented contract is associated with a target object at runtime when applying the mix-in to the target object. The target object may be used in a later context that requires the contract. The code in the later context is able to verify the implemented contract on the target object using reflection.

In yet another implementation, conditions can be assigned to mix-ins that must be met before the mix-in can be applied to the target object. The condition can be a constraint contract that was assigned to the mix-in, and/or can be other conditions. At runtime, if the target object meets the one or more conditions, then the mix-in can be applied to the target object. Otherwise, an exception or other suitable action can be taken.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that allows creation and/or execution of dynamic language script applications, but the technologies and techniques also serve other purposes in addition to these. In one implementation, one or more of the techniques described herein can be implemented as features within a dynamic programming language or framework such as MICROSOFT® ASP.NET Ajax, JavaScript, or from any other type of program or service that allows for creation and/or execution of applications created in a dynamic language.

Figure 1:
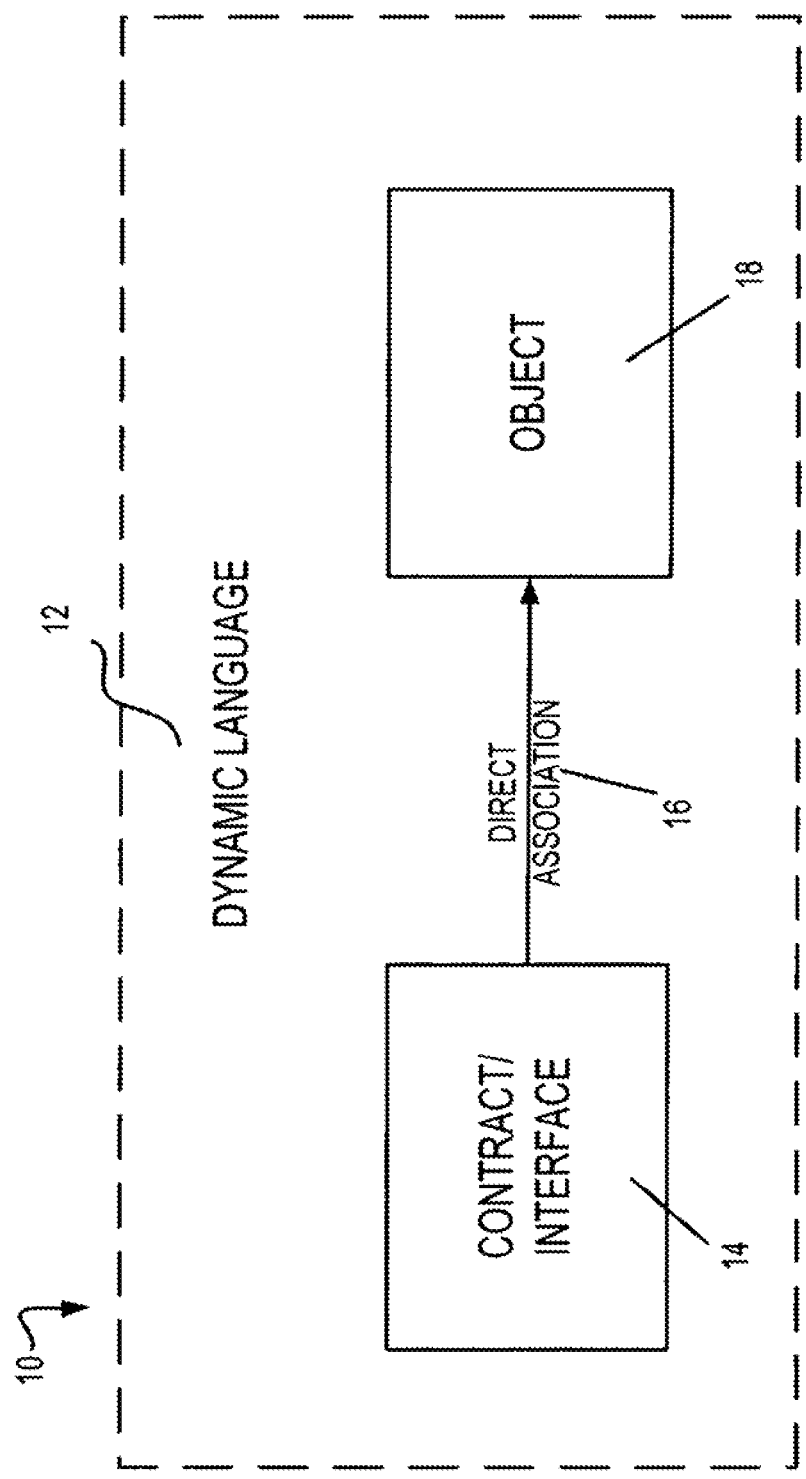
FIG. 1 is a diagrammatic view of a system of one implementation for directly associating contracts with objects.

As shown in the diagram 10 of FIG. 1, in one implementation, a contract or interface 14 can be directly associated 16 with an object 18 or an instance of an object using a dynamic language 12. The term "directly associated" and "direct association" as used herein means a direct relationship between the first and second entity without achieving the relationship indirectly through some other entity. In one implementation, by associating contracts directly with objects, type safety can be introduced to dynamic languages. As noted in the background section, the term "type safety" means determining whether the calling party meets the contract that is expected by the receiving party (the method or other member being called/accessed). One example of such a contract that the receiving party can verify is whether or not the calling party is passing parameters of the correct data type or not. In instances where type safety is violated, an exception can be thrown, or another suitable action can be taken, such as following another path in the program. In one implementation, a runtime environment that executes or otherwise analyzes the dynamic language script containing the direct association is typically the one that makes the type safety determination, but it could also be done separately from the runtime environment, such as during development of the script(s). As described in further detail in FIGS. 5-7, contracts can also be associated with mix-ins in a similar fashion to introduce type safety to mix-ins in dynamic language environments.

Figure 2:
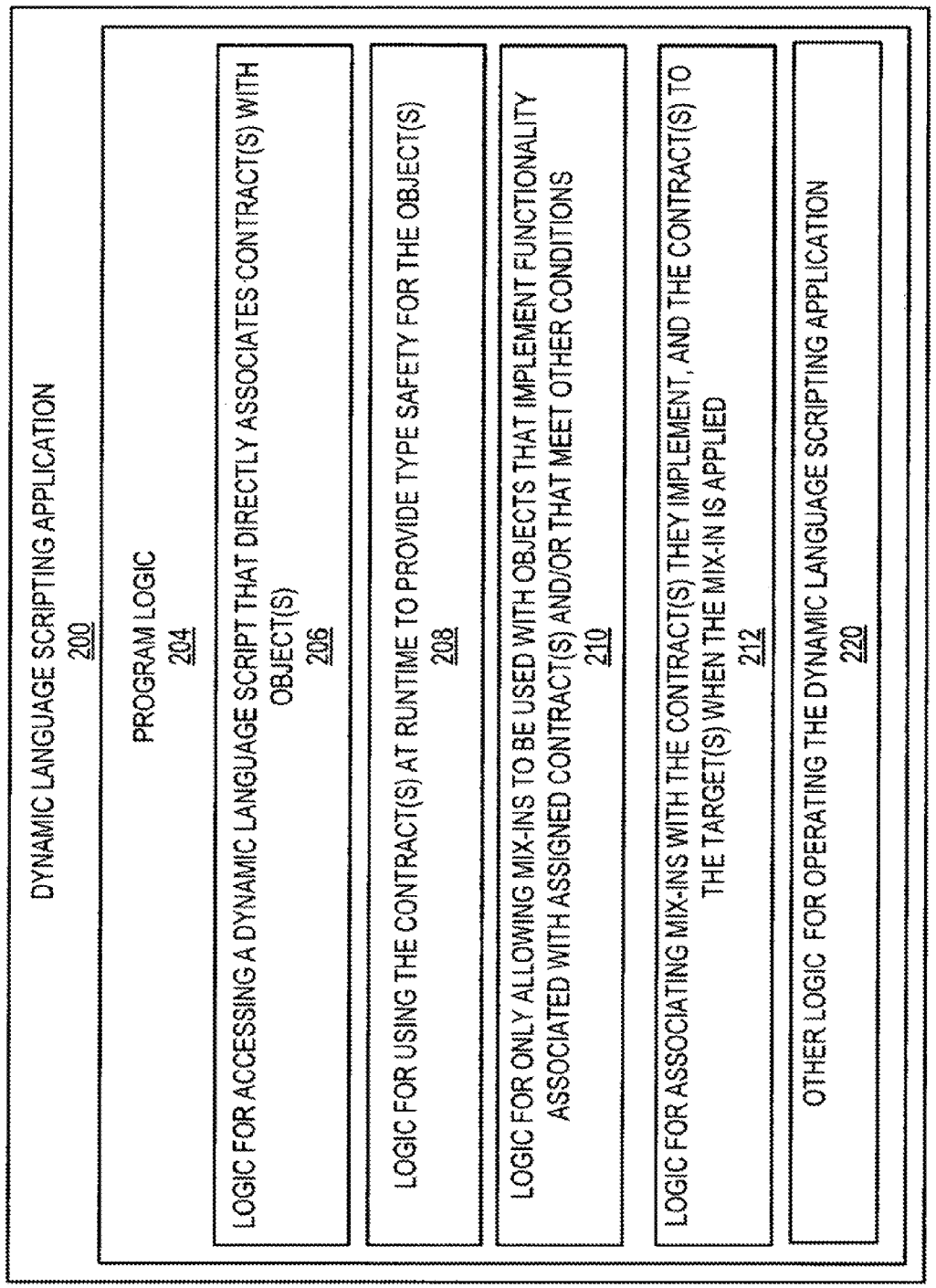
FIG. 2 is a diagrammatic view of a dynamic language scripting application of one implementation.

Turning now to FIG. 2 with continued reference to FIG. 1, a dynamic language scripting application 200 operating on computing device 500 is illustrated. Dynamic language scripting application 200 is one of the application programs that reside on computing device 500 (of FIG. 10). However, it will be understood that dynamic language scripting application 200 can alternatively or additionally be embodied as computer-executable instructions on one or more computers and/or in different variations than shown on FIG. 1. For example, some portions of dynamic language scripting application 200 may be embodied in a software development environment on a developer machine, while other portions of dynamic language scripting application 200 may be embodied in a runtime environment (such as one or more web servers) that execute the software previously created on the developer machine. As another non-limiting example of how dynamic language scripting application 200 could operate differently than shown in FIG. 2, multiple development computers could be used and/or multiple runtime computers could be used. Numerous other variations are also possible.

Alternatively or additionally, one or more parts of dynamic language scripting application 200 can be part of system memory 104, on other computers and/or applications 115, or other such variations as would occur to one in the computer software art.

Dynamic language scripting application 200 includes program logic 204, which is responsible for carrying out some or all of the techniques described herein. Program logic 204 includes logic for accessing a dynamic language script that directly associates contract(s) with object(s) in a dynamic language 206 (as described below with respect to FIG. 3); logic for using the contract(s) at runtime to provide type safety for the object(s) 208 (as described below with respect to FIG. 3); logic for allowing mix-ins to be used with objects that implement functionality associated with assigned contract(s) and/or that meet other conditions 210 (as described below with respect to FIG. 6); logic for associating mix-ins with the contract(s) they implement, and the contract(s) to the target(s) when the mix-in is applied 212 (as described below with respect to FIG. 5); and other logic for operating the dynamic language scripting application 220.

Figure 3:
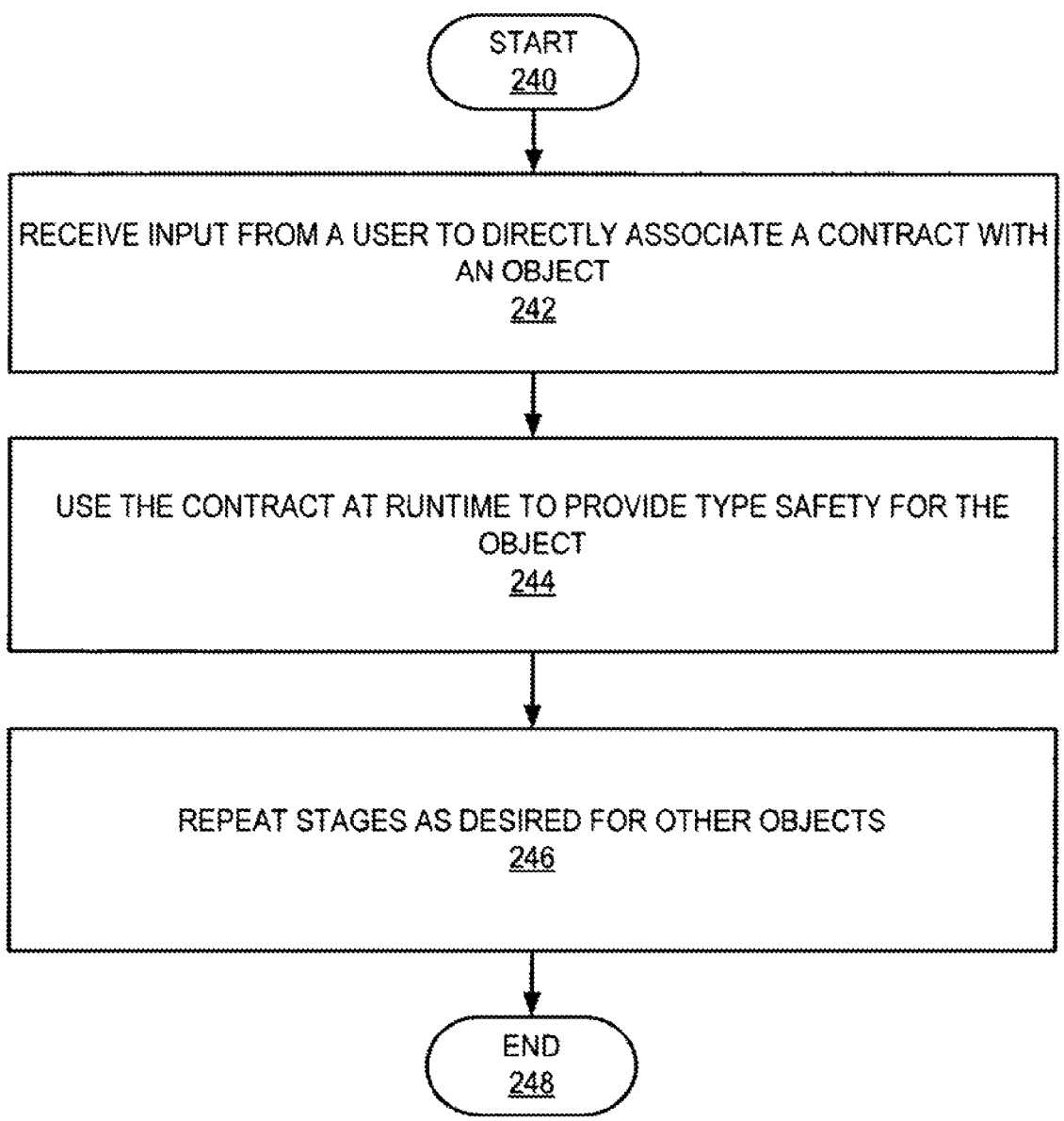
FIG. 3 is a process flow diagram for one implementation illustrating the stages involved in allowing a user to directly associate contract(s) with obj ect(s) in a dynamic language.
Figure 4:
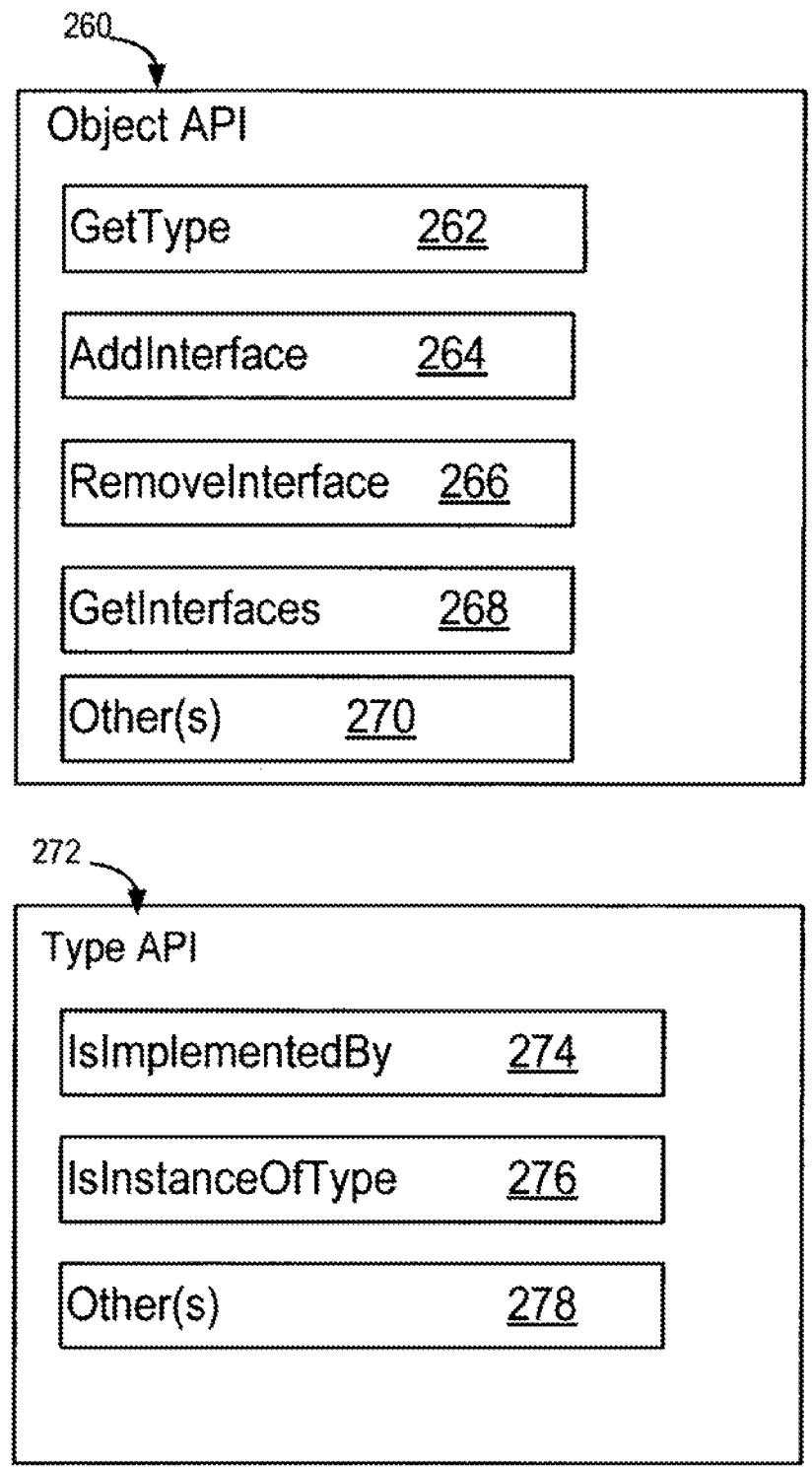
FIG. 4 is a diagrammatic view for one implementation illustrating in exemplary API's for declaring and/or using contracts directly with an object.

Turning now to FIGS. 3-9 with continued reference to FIGS. 1-2, the stages for implementing one or more implementations of dynamic language scripting application 200 are described in further detail. In some implementations, the processes of FIGS. 3-9 are at least partially implemented in the operating logic of computing device 500 (of FIG. 10). FIG. 3 illustrates one implementation of the stages involved in allowing a user to directly associate contract(s) with object(s) in a dynamic language. The process begins at start point 240 with receiving input from a user to directly associate a contract with an object (stage 242). At design time, the user (such as a software developer), can perform this direct association between the contract and the object by inserting source code into a dynamic language script to define the contract, and by inserting source code to map the contract to a particular object. The contract is used at runtime to provide type safety for the object (stage 244). In other words, the dynamic language script is accessed (read or otherwise accessed), and the contract is used to determine whether or not the calling method or member meets the requirements that are expected by the called method or member. When type safety violations are discovered, exceptions can be raised or other steps can be taken to handle the situation appropriately. The stages can be repeated as desired for other objects (stage 246). The process ends at end point 248. In the discussion of FIG. 4, some code examples and further discussion of how contracts can be associated directly with objects will be illustrated.

Turning now to FIG. 4, exemplary API's are shown for declaring and/or using a contract with an object. An Object API 260 is shown along with a Type API 272. The object API 260 contains various methods, such as GetType 262, AddInterface 264, RemoveInterface 266, GetInterfaces 268, and/or other methods 270 which are not described for the sake of simplicity. Let's look at each of these methods in further detail, along with some code examples to illustrate the concepts.

As described previously, contracts or interfaces can be directly associated with objects. To allow for that scenario, it is necessary to have some API method or other way of adding a contract or interface declaration to any object. In one implementation (and using the API illustrated in FIG. 4), this can be accomplished using the AddInterface method 264. Here is an example of what source code might look like using this method:

Object.AddInterface(instance, interfaceType);

After executing the line of code above, the object will contain a direct association with the interface contained as a parameter above. Similarly, in one implementation (and the example shown in FIG. 4), a RemoveInterface 266 method is provided to disassociate the contract from the object. However, this method is not strictly necessary in other implementations.

The GetInterfaces method 268 is used in the exemplary API to allow for reflection. Reflection allows a program to inspect its own structure and functionality, which can be useful for various purposes. One common use for reflection is for programmatically generating documentation of a program. Another common use of reflection is to perform duck-typing as described in the background, such as to help ensure that a particular method uses the parameters in the way expected.

A code example of how the GetInterfaces method 268 could be used is shown below:

Object.GetInterfaces(instance)

In one implementation, use of the GetInterfaces method 268 such as illustrated above will get the interfaces that have been directly associated with the particular object. Alternatively or additionally, the GetInterfaces method 268 may return other associations that are indirect through the object's type.

Let's now turn to the Type API 272 shown in FIG. 4. Three methods are shown in the example, namely the IsImplementedBy method 274, IsInstanceOfType method 276, and other methods 278. In one implementation, existing reflection APIs that may already exist for a given dynamic language framework can be modified to enable some of the techniques described herein, such as to take into account not only class-based interfaces but also the new instance-based ones. In such an implementation, the methods shown in the Type API 272 can be modified to account for this new functionality. In another implementation, new methods can be added that separately query for reflection information that is now available given the ability to directly associate between contracts and objects.

Figure 5:
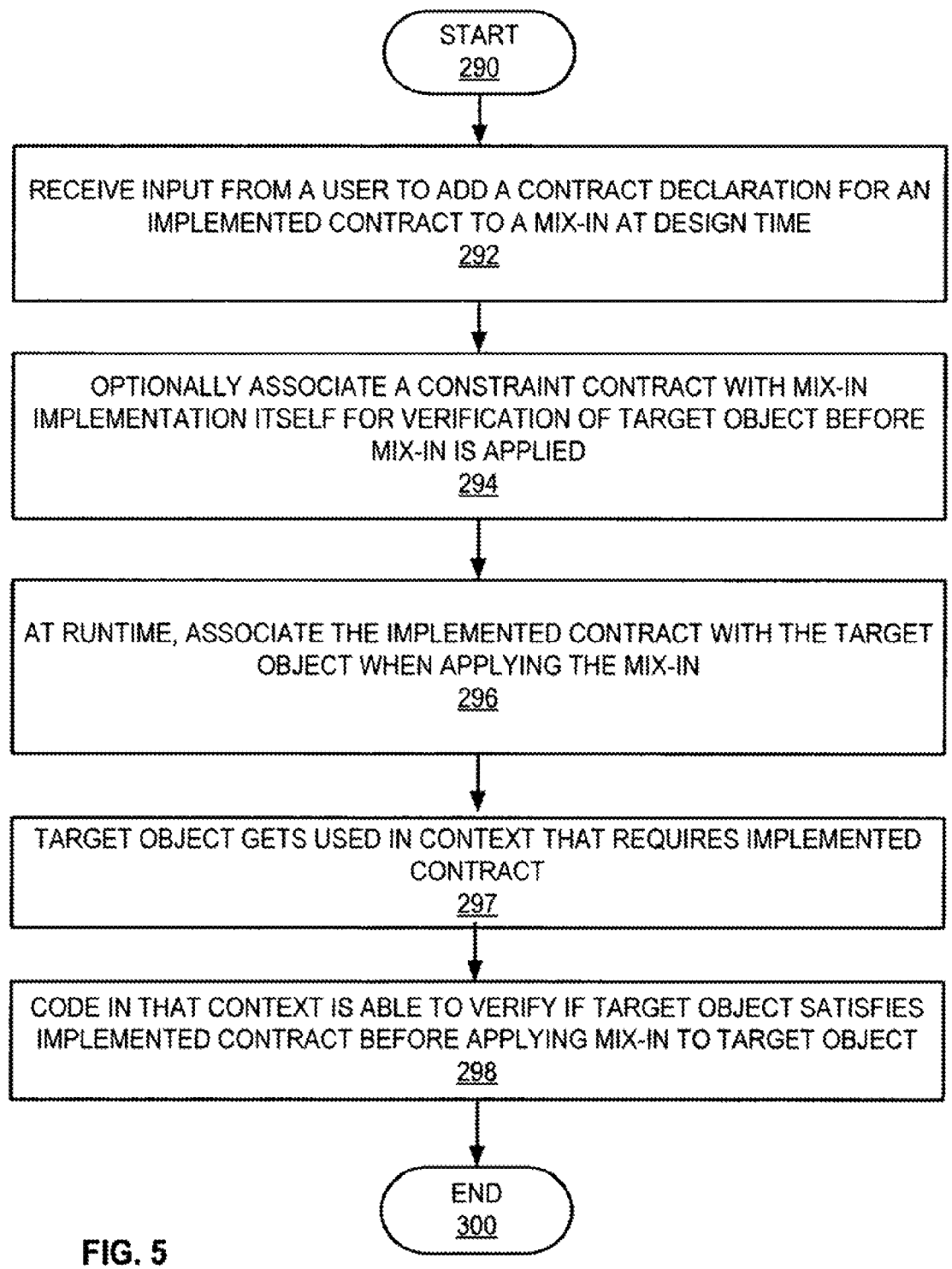
FIG. 5 is a process flow diagram for one implementation illustrating the stages involved in associating mix-ins with contracts.

FIG. 5 illustrates one implementation of the stages involved in associating mix-ins with contracts. As described in the background section, a mix-in is one or more member implementations that can be added dynamically to a target object. A mix-in can contain methods that can be added in one operation to an object, such as with an equivalent to an include statement that refers to the mix-in a group of code. The process begins at start point 290 with receiving input from a user to add a contract declaration for an implemented contract to a mix-in at design time into the dynamic language script(s) (stage 292). An implemented contract is a contract that the mix-in implements and that will be dynamically added to the target. A constraint contract is optionally associated with the mix-in implementation itself for verification of the target object before the mix-in is applied (stage 294). A constraint contract is a contract that constrains what objects the mix-in can be applied to. At runtime, the dynamic language script is accessed (read or otherwise accessed) in order to run the program. The implemented contract is associated with the target object when applying the mix-in to the target object (stage 296). The target object gets later used in a context that requires the implemented contract (stage 297). The code in that context is distinct from the target object and the mix-in. Because the implemented contract was added when the mix-in was applied, the code in that context is able to verify that the target object satisfies the implemented contract, typically using reflection (stage 298), which is described in further detail in FIG. 6. The process ends at end point 300.

Figure 6:
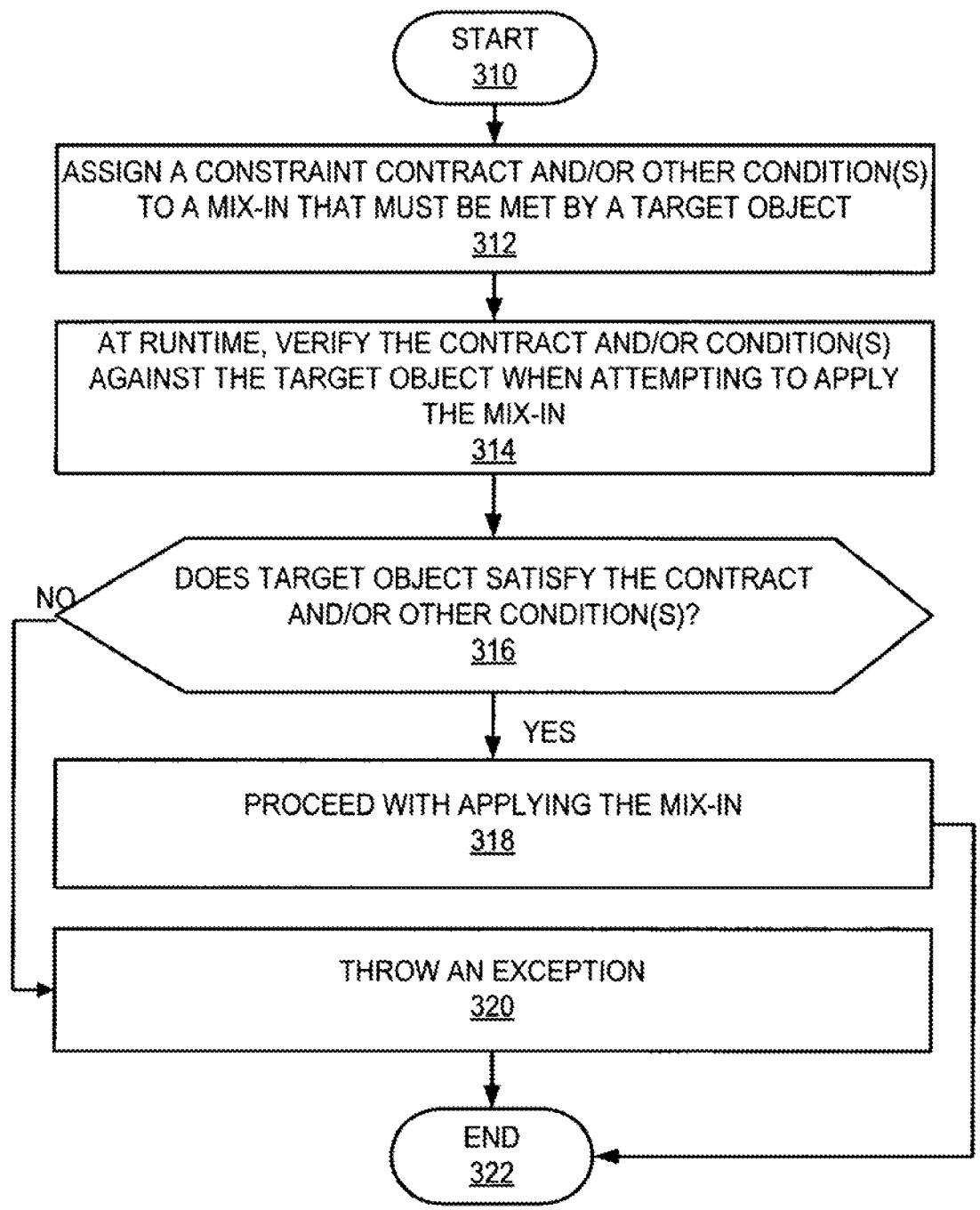
FIG. 6 is a process flow diagram for one implementation illustrating the stages involved in restricting use of mix-ins based on contracts or other conditions.

Before jumping to FIG. 6, however, let's look at an example of how contracts can be used with mix-ins. Suppose you apply an EnumerableArrayEx mix-in like this:

```
var a = ["Zero", "One", "Two", "Three", "Four", "Five", "Six"];
Object.mixin(a, Mixin.Collections.EnumerableArrayEx);
if (Mixin.Collections.IEnumerable.isImplementedBy(a)) {
    var enumerator = a.getEnumerator( );
    while (enumerator.moveNext( )) {
        write(enumerator.get_current( ), "Item");
    }
}
```

In the example above, EnumerableArrayEx is a mixin that provides an implementation of IEnumerable. The EnumerableArrayEx is being added to an array. As soon as this is done, "a" implements the interface, even though its type (Array) doesn't. The interface can then be used with the certainty that checking for the contract provides. In other words, by associating the interface with the mix-in, type safety can be provided. The mix-in packages more information here than just implementation: it also packages the set of interface types that it implements.

In the previous code example, the EnumerableArrayEx mix-in is assuming that its target is an array. Other mix-ins may use one or several interfaces that they expect on their target. In one implementation, the Object.mixin method is responsible for checking that those types are present on the target at runtime. This is described in further detail in FIG. 7. Let's turn now to FIG. 6 before getting back to that concept.

FIG. 6 illustrates one implementation of the stages involved in restricting the use of mix-ins based on contracts or other conditions. The process begins at start point 310 with assigning a constraint contract and/or other condition(s) to a mix-in that must be met by a target object (stage 312). At runtime, the constraint contract and/or condition(s) are verified against the target object when attempting to apply the mix-in (stage 314). An example of another condition that could be used includes a condition evaluated based on the data contained in the object. If the target object satisfies the constraint contract and/or other condition(s) (decision point 316), then the mix-in is applied (stage 318). If the target object does not satisfy the constraint contract and/or other conditions (decision point 316), then an exception is thrown (stage 320), or another suitable action taken. While this process may seem short and simple, it is important to take a moment to emphasize exactly what just happened. By assigning a constraint contract and/or other condition(s) to a particular mix-in, the system was able to enforce type safety for that mix-in. In other words, the mix-in was not allowed to be used unless the object meets the requirements required by the constraint contract or other conditions. The process ends at end point 322.

Figure 7:
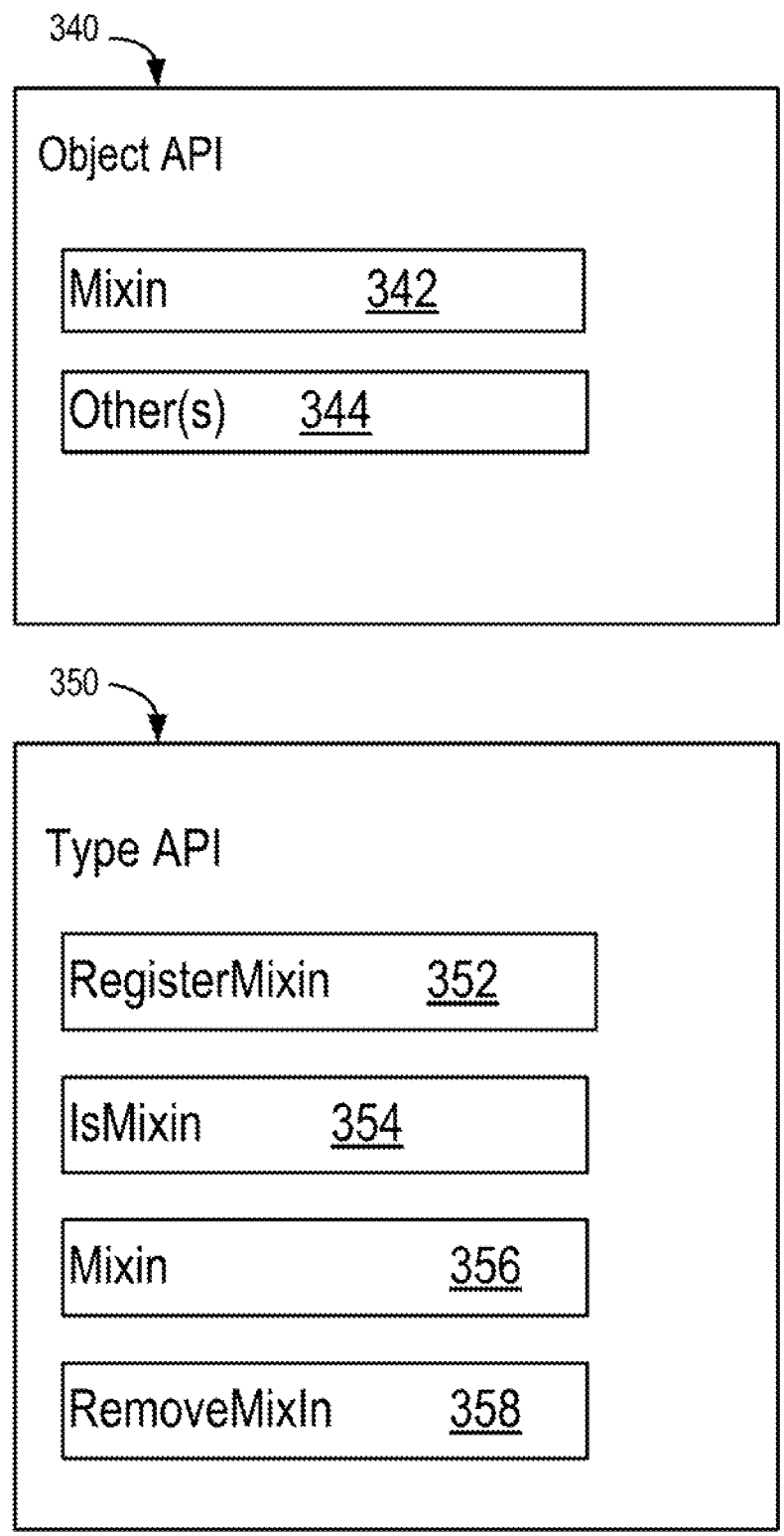
FIG. 7 is a diagrammatic view for one implementation illustrating exemplary API's for registering and/or using mix-ins with an object.

FIG. 7 illustrates one implementation of exemplary API's for registering and/or using mix-ins with an object. In the examples shown, there is an Object API 340 and a Type API 350. The Object API 340 includes a Mixin method 342 and other methods 344. The Mixin method 342 was described briefly in the discussion of FIG. 5. The Mixin method 342 is responsible for checking that the specified types are present on the target object at runtime.

While not strictly necessary, in one implementation, a helper method is provided to declare mixins (RegisterMixin method 352), as well as additional reflection methods that apply to mix-ins (IsMixin 354 and Mixin 356). The RegisterMixin method 352 registers a mix-in, declares which interfaces it provides an implementation for, what types of instances it can extend, and a set of base mix-ins that it will inherit implementations from. In one implementation, all parameters but the type name are optional. A code example is shown below:

```
Type.RegisterMixin(
    typeName, implementedInterfaces, extendedTypes, mixins)
```

Let's now look at an example of a mix-in declaration (note that the actual implementation is not included):

```
Mixin.Collections.CollectionArrayEx.registerMixin(
    "Mixin.Collections.CollectionArrayEx",
    [Mixin.Collections.ICollection],
    [Array],
    [Mixin.Collections.EnumerableArrayEx]);
```

In the example shown, the CollectionArrayEx mix-in implements ICollection (and any interface that the mix-ins it inherits from implement, in this case IEnumerable). The mix-in in this example applies only to Array instances and inherits from EnumerableArrayEx.

The IsMixin method 354 is used to determine if a type is a mix-in. The method returns a true or a false value to indicate whether or not the specified type is a mix-in. Here is an example line of code for how that method could be used:

Type.isMixin(type)

To extend an object or all instances of a type with a mix-in, the Mixin method 342 (for the Object API 340) or the Mixin method 356 (for the Type API 350) can be used. Here is some example code for extending an object using the Mixin method 342.

Object.mixin(target, mixin)

Similarly, here is some example code for extending a type (or all instances of a type) using the Mixin method 356:

Type.mixin(target, mixin)

In one implementation, a RemoveMixin method 358 can also be provided in the Type API 350 to remove a mix-in from an object.

Figure 8:
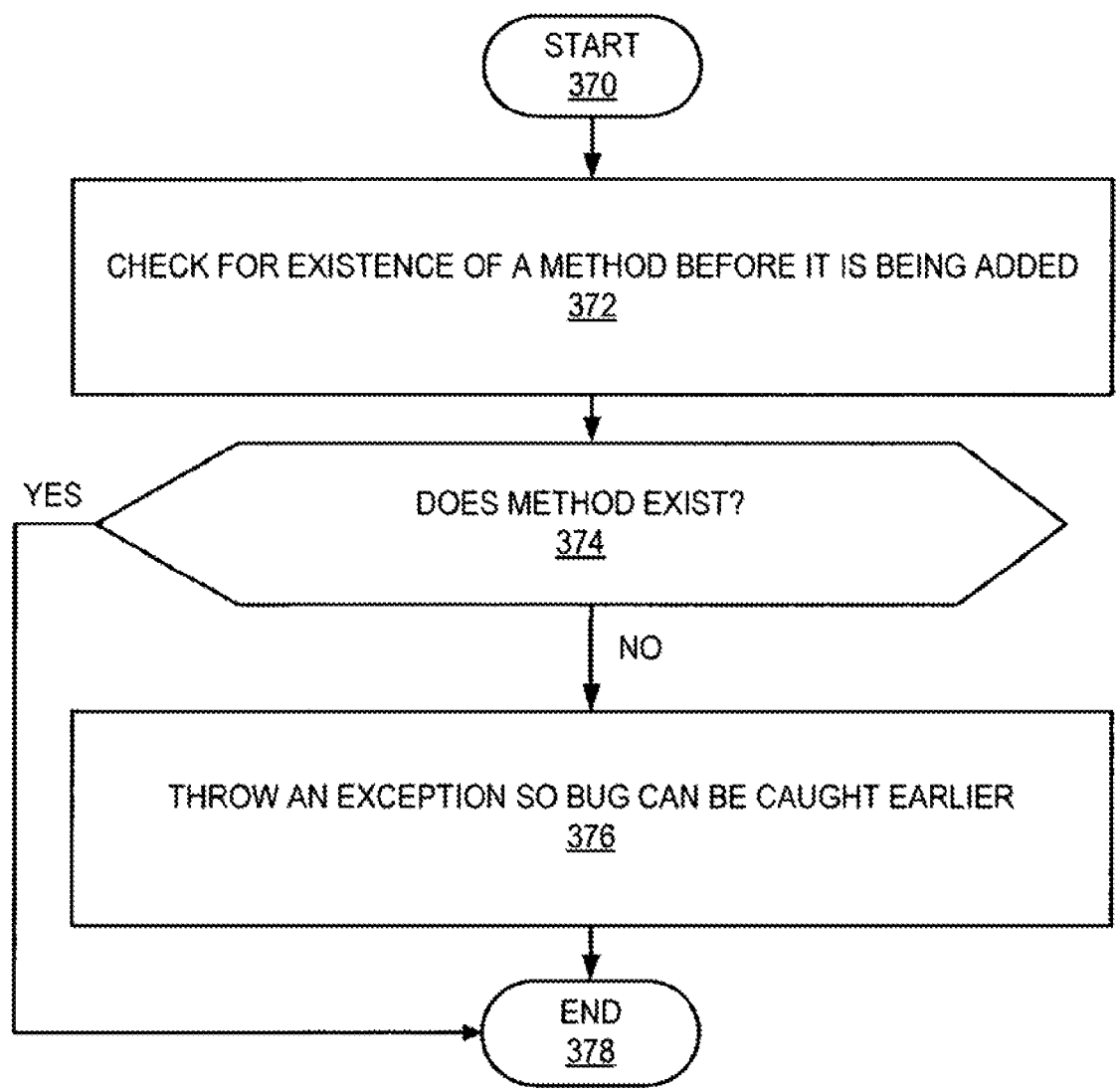
FIG. 8 is a process flow diagram for one implementation that illustrates the stages involved in handling implementation collisions.

FIG. 8 illustrates one implementation of the stages involved in handling implementation collisions. The process begins at start point 370 with checking for the existence of a method before it is being added to the mix-in (stage 372). If a method does not exist (decision point 374), then an exception is thrown so a bug can be caught earlier (stage 376), such as before attempting to make a method call to a method that does not exist. It is better to catch this type of problem before trying to actually call the method. Some or all of the technologies and techniques discussed herein now make such checks possible. The process ends at end point 378.

Figure 9:
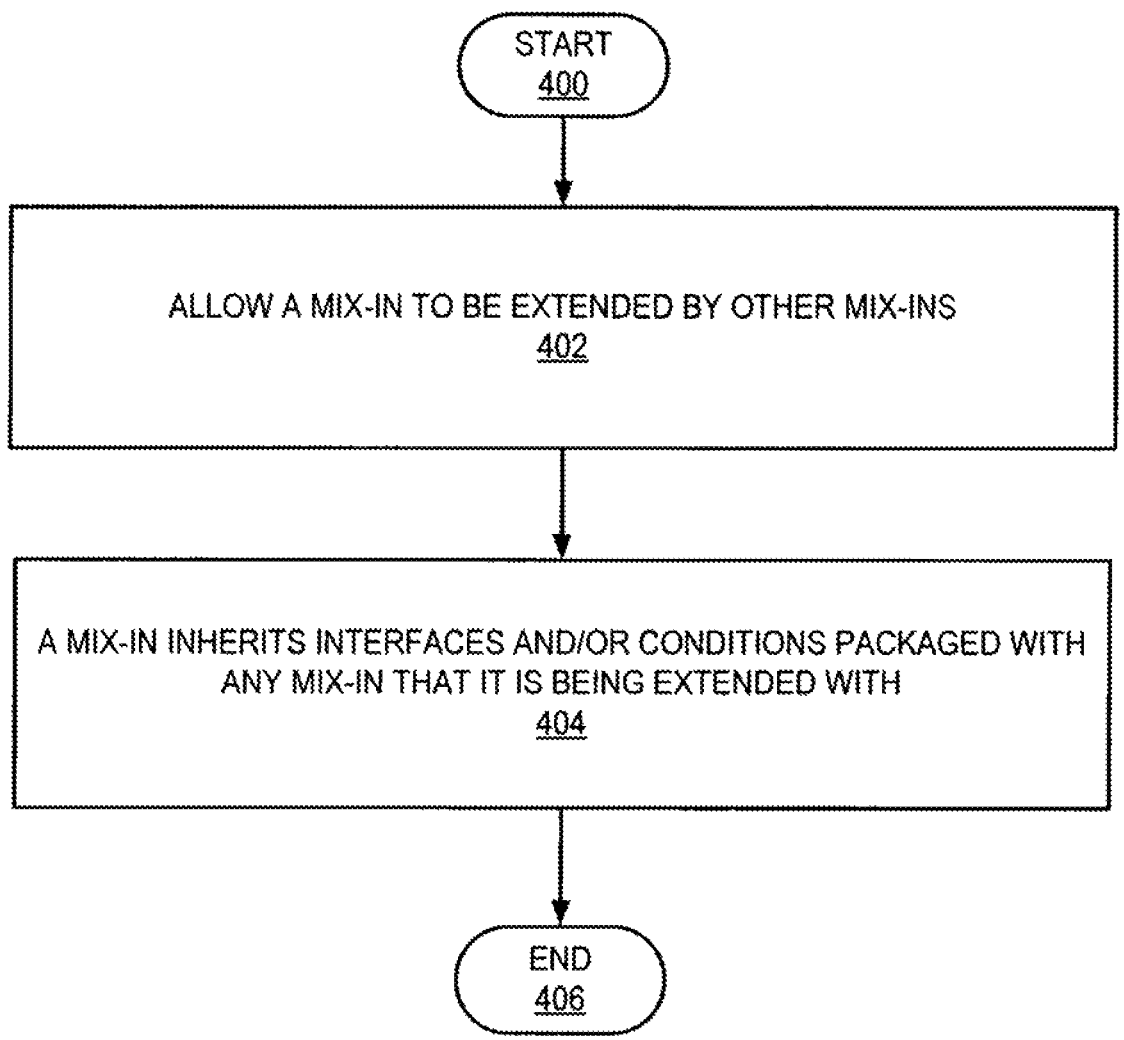
FIG. 9 is a process flow diagram for one implementation that illustrates the stages involved in supporting mix-in inheritance.

FIG. 9 illustrates one implementation of the stages involved in supporting mix-in inheritance. The process begins at start point 400 with allowing a mix-in to be extended by other mix-ins (stage 402). A mix-in inherits interfaces and/or conditions packaged with any mix-in that it is being extended with (stage 404). Let's look at these two stages in further detail to help make them clearer. As described previously in the background section, one of the points of mix-ins is to enable developers to add functionality to objects as needed. There are cases where a library may want to give several different levels of granularity to the features and leave the choice to the developer on what to add. Suppose, for example, that CollectionArrayEx implements both ICollection and IEnumerable, but there is already an implementation of IEnumerable: EnumerableArrayEx. To avoid code duplication, it is possible for a mix-in to be extended by other mix-ins. Essentially, this amounts to mixing EnumerableArrayEx into CollectionArrayEx. The process ends at end point 406.

Figure 10:
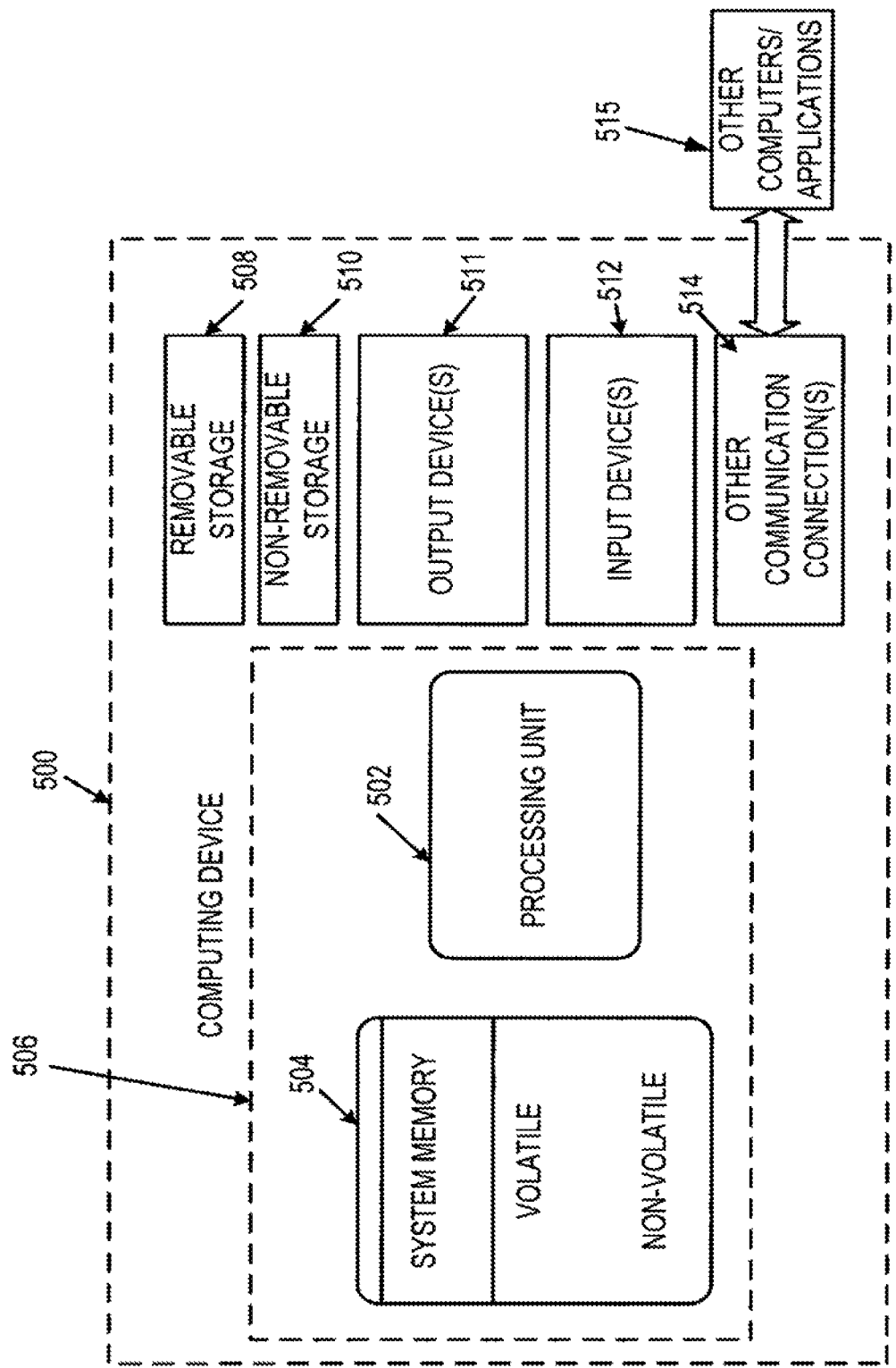
FIG. 10 is a diagrammatic view of a computer system of one implementation.

As shown in FIG. 10, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 10 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 10 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here. In one implementation, computing device 500 includes dynamic language scripting application 200 (described in FIG. 2 and other figures herein).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method, comprising:
    receiving a method call to register a mix-in, the method call including as a parameter a set of base mix-ins from which the mix-in inherits;
    at runtime of a target object, before applying the mix-in to the target object, determining whether the target object meets at least one constraint contract that constrains objects to which the mix-in can be applied;
    if the target object meets the at least one constraint contract, at runtime, applying the mix-in to the target object; and
    if the target object does not meet the at least one constraint contract, at runtime, throwing an exception.

2. The method of claim 1, wherein the method call further includes as a parameter at least one of an interface implementation provided by the mix-in or a set of types the mix-in is able to extend.

3. The method of claim 1, further comprising:
    associating with the mix-in the at least one constraint contract that constrains objects to which the mix-in can be applied and that must be met by the target object before the mix-in can applied to the target object.

4. The method of claim 1, wherein the target object is an instance of a class.

5. The method of claim 1, wherein determining whether the target object meets the at least one constraint contract is performed using reflection.

6. The method of claim 1, wherein the at least one constraint contract defines a condition.

7. A memory having computer-executable instructions for causing a computer to perform steps comprising:
  receiving a method call to register a mix-in, the method call including as a parameter a set of base mix-ins from which the mix-in inherits;
  at runtime of a target object, before applying the mix-in to the target object, determining whether the target object meets at least one constraint contract that constrains objects to which the mix-in can be applied;
  if the target object meets the at least one constraint contract, at runtime, applying the mix-in to the target object; and
  if the target object does not meet the at least one constraint contract, at runtime, throwing an exception.

8. The memory of claim 7 having further computer-executable instructions for causing the computer to perform steps comprising:
  associating with the mix-in the at least one constraint contract that constrains objects to which the mix-in can be applied and that must be met by the target object before the mix-in can be applied to the target object.

9. The computer storage memory of claim 7, wherein the target object is an instance of a class.

10. The memory of claim 7, wherein determining whether target object meets the at least one constraint contract is performed using reflection.

11. The memory of claim 7, wherein the at least one constraint contract defines a condition.

12. A system for restricting the use of mix-ins based on meeting of conditions comprising:
  a computer comprising a processing unit coupled to a memory, the memory storing computer-executable instructions which, when executed, cause the processing unit to perform the steps of:
  receiving a method call to register a mix-in, the method call including as a parameter a set of base mix-ins from which the mix-in inherits;
  at runtime of a target object, before applying the mix-in to the target object, determining whether the target object meets at least one constraint contract that constrains objects to which the mix-in can be applied;
  if the target object meets the at least one constraint contract, at runtime, applying the mix-in to the target object; and
  if the target object does not meet the at least one constraint contract, at runtime, throwing an exception.

13. The system of claim 12, wherein the method call further includes as a parameter at least one of an interface implementation provided by the mix-in or a set of types the mix-in is able to extend.

14. The system of claim 12, the memory storing further computer-executable instructions, which, when executed, cause the processing unit to perform the step of:
  associating with the mix-in the at least one constraint contract that constrains objects to which the mix-in can be applied and that must be met by the target object before the mix-in can be applied to the target object.

15. The system of claim 12, wherein determining whether the target object meets the at least one constraint contract is performed using reflection.

16. The system of claim 12, wherein the at least one constraint contract defines a condition.

17. The system of claim 12, wherein the target object is an instance of a class.

* * * * *